Feb. 1, 1927.　　　　　1,616,312
W. FALKENBERG
CALORIMETER AND PROCESS OF MEASURING HEAT
Filed June 6, 1923　　　2 Sheets-Sheet 1
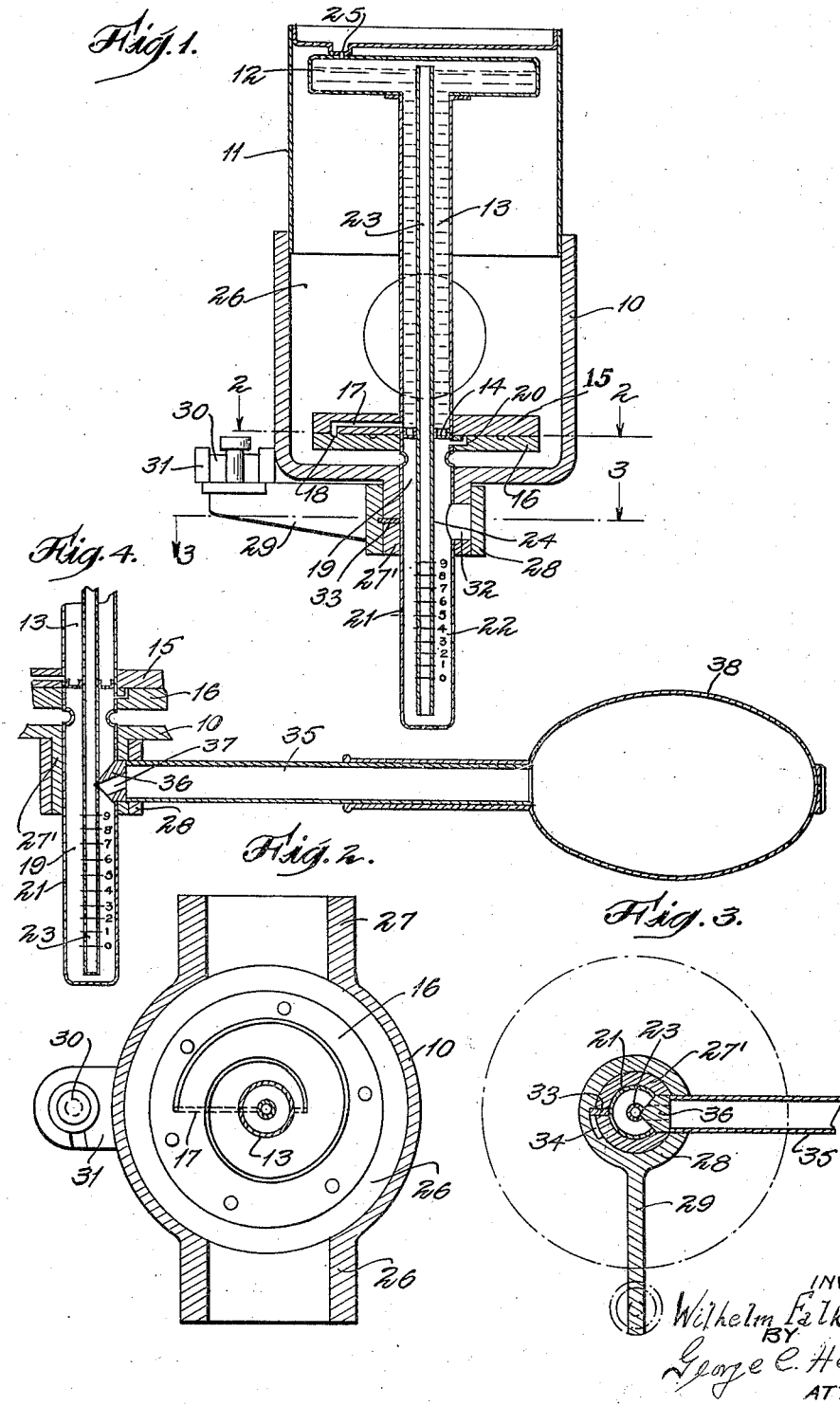
INVENTOR.
Wilhelm Falkenberg
BY George C. Heinricie
ATTORNEY Feb. 1, 1927.
W. FALKENBERG
1,616,312
CALORIMETER AND PROCESS OF MEASURING HEAT
Filed June 6, 1923
2 Sheets-Sheet 2

INVENTOR.
Wilhelm Falkenberg
BY
George C. Henrick
ATTORNEY.

Patented Feb. 1, 1927.

1,616,312

UNITED STATES PATENT OFFICE.

WILHELM FALKENBERG, OF NEW YORK, N. Y., ASSIGNOR TO ALBERT WIELICH, OF NEW YORK, N. Y.

CALORIMETER AND PROCESS OF MEASURING HEAT.

Application filed June 6, 1923. Serial No. 643,752.

This invention relates to improvements in calorimeters, particularly apparatus for measuring the heat supplied to rooms, buildings, machines, etc., and it is the principal object of the invention to provide an apparatus allowing a calculation of the amount of coal used for developing the heat furnished and consequently ascertaining the quality of coal used.

Another object of the invention is the provision of a novel apparatus of this type which is durable, cheap to manufacture and which can readily be installed into any heat conduit at present in use.

A further object of the invention is the provision of an apparatus indicating by the successive melting of an easily fusible material of viscous consistency, the amount of heat used for certain purposes.

A still further object of the invention is the provision of means for readily resetting the apparatus after its use for a predetermined time.

The invention has also as one of its objects the provision of a novel process for measuring the heat supplied by heat supplying conduits at certain predetermined intervals.

It is furthermore one of the main objects of the invention to employ as measuring agent an ordinarily solid substance of a viscosity which readily follows the deviations in temperature of for instance hot water heating apparatus and conduits for indicating the exact amount of calories used for heating a house or apartment.

These and other objects of my invention will become more fully apparent as the description thereof proceeds and will then be more specifically pointed out in the appended claims.

In the accompanying drawing, forming a material part of this disclosure:

Figure 1 is a longitudinal section through the apparatus constructed according to my invention.

Figure 2 is a cross-section through the apparatus on line 2—2 of Figure 1.

Figure 3 is a similar section taken on line 3—3 of Figure 1.

Figure 4 is a sectional view of the lower part of the apparatus Figure 1 at a right angle thereto.

Figure 5:
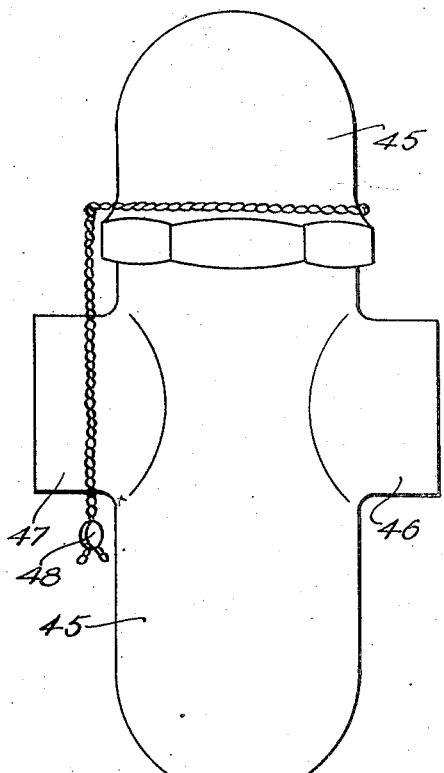
Fig. 5 is an elevation of a modified form of the invention.

In the form of my apparatus illustrated in Figures 1 to 4, 10 indicates a casing, the upper part 11 of which includes a vessel or container 12, the lower part of which is formed into a tube 13. The lower part of this tube is closed by a bottom part 14 and carries two discs 15 and 16 having their polished faces in engagement. The upper disc 15 is provided with a channel 17 which at one end is in communication with tube 13 above its bottom part 14, while the other end of channel 17 is in communication with a spiral capillary groove 18 of very small cross-section which is scratched into the face of the lower disc 16 and which communicates with a chamber 19 below the bottom part 14 through a bore 20. This chamber is formed by a measuring vessel in the form of a glass tube 21, which forms a continuation of the tube 13. The tube 21 is equipped with a graduated scale 22.

A capillary tube 23 extends through tube 13, the bottom 14 thereof and the tube 21 and has a lateral opening 24 connecting the chamber 19 with the interior of tube 23. The container 12 and that part of the tube 13 above the bottom 14 are filled with paraffin or a similar easily fusible material of viscous consistency, while an opening 25 connects the container 12 with the atmosphere.

The measuring device is mounted in a heat conduit between the branches 26 and 27 thereof in such a manner that the heating medium circulates through the chamber 26 in casing 10 around the container 12, the tube 13 and the discs 15 and 16. Consequently the paraffin contained in tube 13 and container 12 will melt and flow through channel 17, groove 18, and bore 20 and drop into the measuring chamber 19.

The air contained within chamber 19 will escape through opening 24 and tube 23. The liquid paraffin entering through the capillary channels into the chamber 19 will constitute a measure unit for measuring the calories or heat units used in melting the indicated quantity of paraffin, it being understood that the scale is marked to indicate the number of calories required to melt the volume of paraffin corresponding to the particular scale mark.

In order to protect the device against manipulation by unauthorized persons, and to enable a replacing of the paraffin, at certain time limits, the following construction is provided.

The lower end of casing 10 is equipped with a hub 27' around which a ring 28 is rotatably guided. An arm or lever 29 is attached to this ring which carries a pin 30 engaging a ring-shaped projection or ear 31 of casing 10, and both parts 30 and 31 can be connected by means of a seal which simultaneously secures the ring 28 against accidental displacement or rotation. In this position the ring covers an opening 32 leading to chamber 19. A pin 33 on hub 27 secures ring 28 to the hub by entering a groove 34 in the ring, and this pin and groove connection limits the relative rotary movement of the parts.

In the position illustrated in Figure 1, the parts are shown in the working or measuring position of the instrument.

After a certain predetermined time, the meter is read, and after the removal of the seal, the lever 29 is swung into a position in which the opening 32 is in communication with an opening in ring 28 of equal size, best illustrated in Figures 3 and 4.

A metal tube 35 is introduced through the openings in ring and hub, so that the conical end 36 of this tube closes the opening 24 in tube 23, while however by means of the channel 37 (Fig. 4) a communication is established between chamber 19 and a bulb 38.

The paraffin contained in tube 21 which in the meantime had solidified is made liquid again by heating it, and upon the operation of the bulb, will be pressed back into the tube 23 and through the open upper end of the same into the container or vessel 12. In this manner the device is ready for another measuring operation after the lever 29 has been swung back into its position illustrated in Figure 1.

Figure 6:
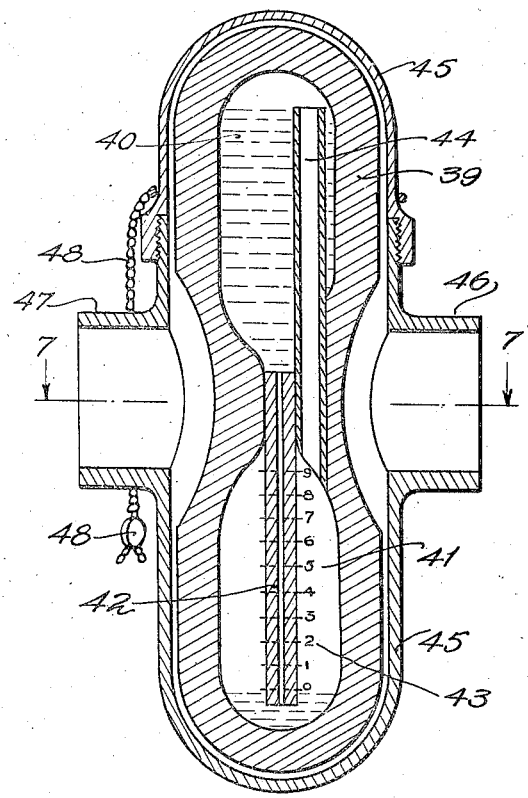
Fig. 6 is a longitudinal section through the same taken on line 6—6 of Fig. 7.
Figure 7:
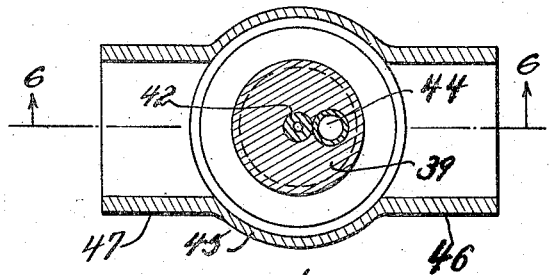
Fig. 7 is a transverse section of the same on line 7—7 of Fig. 6.

The modified form of my device illustrated in Figures 5 to 7 comprises a glass body 39 in the form of the customary sand glasses having an upper chamber 40 and a lower chamber 41. The lower chamber 41 is in communication with the upper chamber 40 by means of a capillary tube 42 extending into the lower chamber 41, which carries a graduated scale 43.

The chambers 40 and 41 moreover are connected by means of a tube 44 which extends into the upper chamber 40, which is filled with an easily fusible mass.

The body 39 is located within a bi-partite metal casing 45 and spaced therefrom which metal casing is mounted between the branches 46 and 47 of a heat conduit in such a manner that the heating medium will circulate around the body 39. A suitable seal 48 secures the measuring device against tampering by unauthorized persons.

It will be clear that the paraffin liquefied by the heating medium will slowly flow drop by drop from the upper chamber 40 through the capillary tube 42 into the lower chamber 41, while the air will escape through tube 44 into the upper chamber 40.

After a certain predetermined time, the meter is read, and the paraffin in chamber 41 which in the meantime has solidified therein, is heated and when the casing 45 is inverted, the paraffin will flow back into chamber 40 through tube 44.

It will be clear that in making the graduation of the scale, the fact should be considered that in time the liquid level must gradually sink on account of the evaporation and that thereby the pressure upon the capillary tube 42 will change.

It is to be understood that the selection of the fusible substance must vary with the various uses, so for instance with hot water heating conduits a solution of colophony and ricinus oil has been found to give the best results.

Having thus described my invention what I claim as new, and desire to protect by Letters Patent is:

1. A multiple chambered casing, means for connecting the casing in a heat conduit, a substance in one chamber of the casing adapted to be slowly melted by the heat passing through the conduit, means for providing a restricted passage for the flow of the melted substance from one chamber to the other, there being a calorie indicating scale arranged on the chamber to which the flow takes place, said scale being adapted to indicate in accordance with the quantity of substance melted and flowing into the chamber in a fixed time.

2. A heat meter including an upper chamber open to receive a heat transmitting medium, a lower chamber bearing a scale, a fusible substance container arranged in the upper chamber, there being a restricted passage between said container and the lower chamber, and means for returning the material from the lower chamber to said container.

3. A heat meter, including an upper chamber open to receive a heat transmitting medium, a lower chamber bearing a scale, a fusible substance container arranged in the upper chamber, there being a restricted passage between said container and the lower chamber, and a tube extending lengthwise the lower chamber and container and opening into the extreme ends of both chambers.

4. A heat meter, including an upper chamber open to receive a heat transmitting medium, a lower chamber bearing a scale, a fusible substance container arranged in the upper chamber, there being a restricted passage between said container and the lower chamber, a tube extending lengthwise the lower chamber and container and opening into the extreme ends of both chambers, and means for exerting a pressure upon the material in the lower chamber to direct the same lengthwise the tube.

In testimony whereof I have affixed my signature.

WILHELM FALKENBERG.